United States Patent [19]
Schulte

[11] 3,768,508
[45] Oct. 30, 1973

[54] VALVE FOR CONTROLLABLE RELEASE OF ENTRAPPED BODY FLUIDS

[76] Inventor: Rudolf R. Schulte, 5377 Overpass Rd., Santa Barbara, Calif. 93105

[22] Filed: Jan. 24, 1972

[21] Appl. No.: 220,248

[52] U.S. Cl............ 137/522, 128/350 V, 137/525, 251/331
[51] Int. Cl...................... F16k 15/14, A61m 27/00
[58] Field of Search............... 137/525, 522, 525.3; 251/331; 128/350 R, 350 V

[56] References Cited
UNITED STATES PATENTS
3,111,125  11/1963  Schulte........................... 128/350 V
3,595,240  7/1971  Mishler........................... 128/350 V

*Primary Examiner*—Robert G. Nilson
*Attorney*—D. Gordon Angus et al.

[57] ABSTRACT

A valve for controllably releasing entrapped body fluids, such as fluid from inside the skull of persons suffering from hydrocephalus. The valve includes a diaphragm which tends to close a valve seat and prevent flow of such fluid, and mechanical means for moving said diaphragm so as to open the valve to flow. The mechanical means may comprise a projection on the diaphragm which is contactible by a flexible portion of the body of the valve.

17 Claims, 9 Drawing Figures

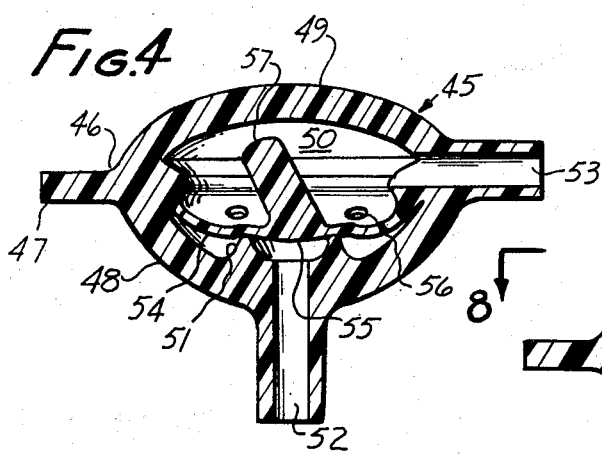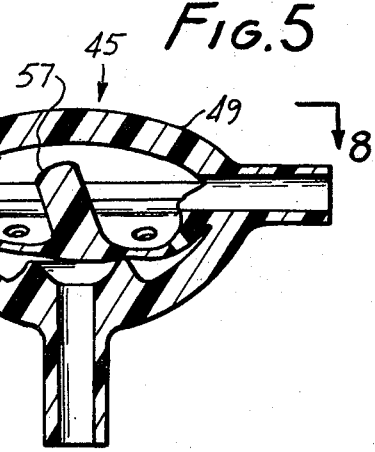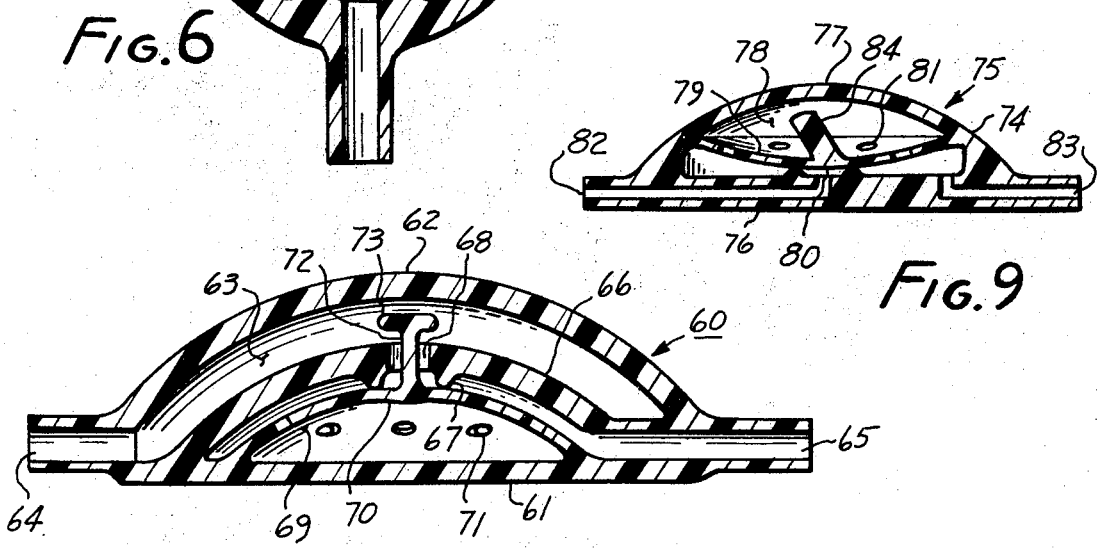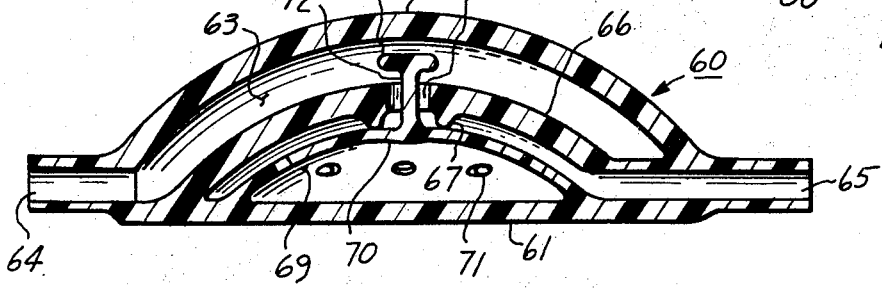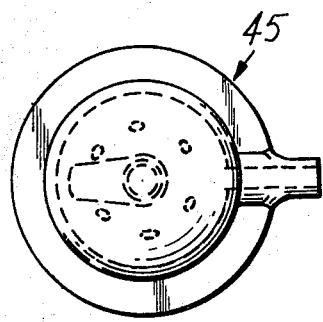

3,768,508

VALVE FOR CONTROLLABLE RELEASE OF ENTRAPPED BODY FLUIDS

This invention relates to valves for the controllable release of entrapped body fluids.

Certain ailments of the human body involve the failure of the body properly to drain fluids from its cavities. A well-known example of such an ailment is hydrocephalus, wherein the cerebrospinal fluid is not drained at the correct rate from the brain, and, as a consequence, the head is distended and the person's brain is adversely affected.

Means have heretofore been provided to shunt the cerebrospinal fluid from the cranium, and such means are also useful in other regions of the body as well. A classical example is shown in Schulte U.S. Pat. No. 3,111,125, issued Nov. 19, 1963, entitled "Drainage Device," wherein a combined pump and check valve is disposed between a drainage catheter which is inserted into the cranium and a shunt tube with a check valve which customarily discharges into the heart.

The aforesaid shunting techniques and mechanisms have served their purpose very well, and many persons are alive and normal today who otherwise would long ago have been dead, or have been mentally retarded if they had survived. As the years have passed since the inauguration of this technique, the alleviation of the immediate problems has enabled development to refine the technique so as to encourage the body to correct itself. One of the problems involved in the presently-known means for drainage is that the body may no longer attempt to overcome its malfunction, and instead the person will become reliant upon the shunt for the rest of his life. It is an object of this invention to provide a shunt technique and device which in many cases may be expected to release the person from dependency on a shunt.

One of the reasons which is currently postulated for the continuing dependency of a person upon his shunt is that perhaps too much of the fluid is drained, and the pressure lowered too much. If, instead, more pressure were maintained in the cranium, there might be a tendency for the drainage passages later to open up. If so, then the person's dependency on the shunt might be overcome. It is, therefore, theorized that it would be advantageous to maintain a relatively high pressure in the cranium, but, of course, this pressure must be such that the person would not be harmed or made miserable by it. In approaching this objective, a valve can be provided which will tend to open at a given pressure. Suppose, however, that this pressure proved to be too high for the individual to tolerate for extended periods of time; then means should be provided for opening the valve so as to release the excessive pressure and relieve him. Such a valve thereby becomes a humane means of retaining pressure at some relatively high level, but able to release fluid to achieve a lower pressure level should the greater pressure become intolerable.

A valve according to this invention comprises a body having an inner surface bounding a flow cavity. The body has a flexible portion which can be moved into the cavity. A first and a second conduit enter the cavity through the body and provide for flow of fluid through the same. A valve seat is provided in the cavity, across which seat fluid must pass when flowing from one conduit to the other. A diaphragm extends across the cavity. It has an imperforate portion overlaying the valve seat and is so proportioned and arranged as to close the seat in one position. A projection on one of the inner wall and the diaphragm is so disposed and arranged as to be contacted by the other, thereby to displace the diaphragm from the seat and to permit fluid to flow across the seat.

According to a preferred but optional feature of the invention, the projection is integral with the diaphragm and forms an oblique lever relative to the plane of the valve seat.

According to another preferred but optional feature of the invention, a barrier extends across the cavity, the valve seat being formed on the barrier with a flow port passing through the barrier within the valve seat. The diaphragm lies on one side of the barrier adjacent to the valve seat, and the projection passes through the flow port, having a cross-section less that that of the flow port.

The above and other features of this invention will be fully understood from the following detailed description and the accompanying drawings in which:

FIGS. 4, 5 and 6 are axial cross-sections of another embodiment of the invention in various operating positions thereof;

FIG. 7 is an axial cross-section of still another embodiment of the invention;

FIG. 8 is a top view of FIG. 5 taken at line 8—8 therein; and

FIG. 9 is an axial cross-section of still another embodiment of the invention.

Figure 1:
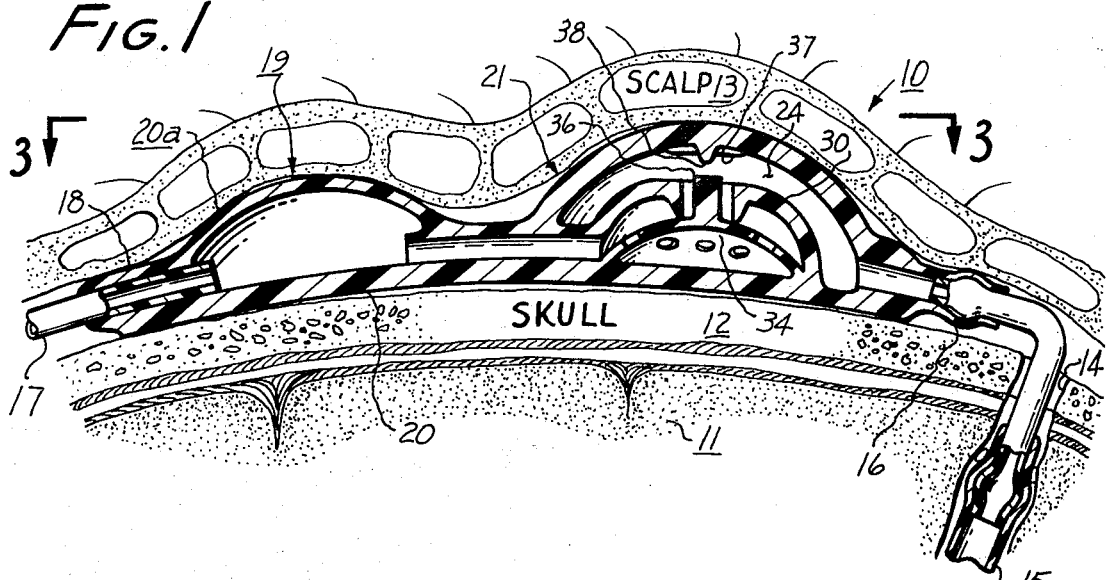
FIG. 1 is an axial cross-section showing the presently preferred embodiment of the invention.

Valve 10 according to the invention is intended to drain cerebrospinal fluid from brain 11 which lies within a skull 12 that is overlaid by a scalp 13. In accordance with conventional practice, the valve has been laid under the scalp and the scalp has been sutured in place.

A burr hole 14 has been drilled through the skull, and a drainage catheter 15 has been inserted into the brain to collect the fluid to be removed from the skull. The drainage catheter joins to the valve at a connector 16. A shunt tube 17, of the type generally shown in Heyer U.S. Pat. No. 3,020,913, issued Feb. 13, 1962, entitled "Surgical Drain," which includes a check valve in the form of a slit at its free end, is attached by connector 18 to a lozenge 19. The lozenge has a base 20 and a flexible dome 20a, which can be depressed so as to squeeze the lozenge for purposes yet to be disclosed. The shunt tube connects to the valve through this lozenge.

Valve 10 includes a body 21 having a flat base 22 to which there is attached a dome-shaped, flexible portion 23 which, with the flat base, forms an internal flow cavity 24. A first conduit 25 and a second conduit 26 enter the cavity, conduit 25 being the upstream conduit, and conduit 26 being the downstream conduit. Drainage through the valve is from the drainage catheter through conduit 25, the flow cavity 24, conduit 26, lozenge 19, and shunt tube 17, in that order.

A barrier 30 extends across the flow cavity so as to divide the cavity into two sections. This barrier is stiffly flexible and tends to retain its shape except under relatively strong force. A valve seat 31 is formed on the lower surface of the barrier, and a flow port 32 passes through the barrier inside the valve seat.

A diaphragm 33 also extends across the cavity and includes an imperforate portion 34 near its center which is so proportioned as to overlay the valve seat and to close it in the position shown in FIG. 1. Perforations 35 pass thorugh the diaphragm in regions outside the imperforate portion 34.

A projection 36 is integral with the diaphragm and passes thorugh the flow port. Its cross-section is less than that of the flow port so that fluid can pass through the flow port even when the projection stands inside it.

On the inner surface of the flexible portion there is provided a contact portion 37. This portion is a cruciform structure with a central nib 38 and ribs 39 which form bypass channels 37a. When the flexible portion is pressed down against the barrier, these channels will still permit fluid to flow into the flow channel.

This valve, as is the case in the other embodiments hereof, is preferably made of medical grade silicone rubber. The desired stiffness of the various items can be developed by appropriate selection of the thickness and physical properties of the material. The entire construction can be bonded together by suitable adhesives, such as room-temperature vulcanizing medical grade silicone rubber. In any event, the materials which will come into contact with tissue will be selected for compatibility therewith.

The diaphragm will have sufficient inherent structural strength in the sense of rigidity or stiffness so that it will tend to resist its displacement from the position shown in FIG. 1. If desired, bias means such as a spring may be placed beneath it to assist this tendency. Usually, however, the stiffness of a properly selected diaphragm will be sufficient for the purpose. The barrier should be relatively stiff so as to hold the valve seat in place relative to the base, although not so stiff as to be immovable and constitute a possible risk of damage to other parts of the valve when the valve is compressed. The flexible portion of the body should be readily deflectible by application of the thumb to the scalp. Suitable dimensions for this device will be readily apparent to persons skilled in the art.

Another embodiment of the invention is shown in FIGS. 4, 5, 6 and 8, wherein a valve 45 includes a body 46 with a flange 47 to aid in the stabilization of the device in situ. It, too, has a base 48, and a flexible portion 49 attached to the base so as to form a flow cavity 50 inside the body. A valve seat 51 is formed on the base, and this valve seat, as is true of the other valve seats in all of the embodiments disclosed herein, is circular, with its edge lying in a plane.

Inlet (first) conduit 52 passes through the base and enters the flow cavity inside the valve seat. Outlet (second) conduit 53 passes through the wall on the other side of a diaphragm 54. The diaphragm has a central imperforate portion 55 which overlays and closes the valve seat as before. It also has perforations 56 therethrough outside the imperforate portion. Projection 57 is integral with the diaphragm and projects therefrom at an angle oblique to the plane of the valve seat so as to form an oblique lever. Downward force on the projection is intended to open the valve seat, as will be more fully described below.

In accordance with the invention, a check valve 58, such as shunt tube 17, may be connected to the outlet conduit if desired.

FIG. 7 shows another embodiment of the invention wherein a valve 60 includes a base 61, dome-shaped, flexible portion 62, flow cavity 63, inlet (first) and outlet (second) conduits 64, 65. A barrier 66 extends across the cavity and carries a valve seat 67, there being a flow port 68 through the barrier within the valve seat.

A diaphragm 69 also extends across the cavity, having a central imperforate portion 70, with perforations 71 therethrough outside portion 70. The primary difference between the embodiment of FIGS. 4 and 7 is that, in FIG. 4, the base is curved so as to fit in a burr hole in the skull, while in FIG. 7, the device is flat so as to fit against the skull as in FIG. 1. Another difference resides in projection 72 which carries a head 73 contactible by the flexible portion.

FIG. 9 is another flat-bottomed embodiment of the invention and represents a modification of the device of FIG. 4. In this embodiment, the body 74 of valve 75 has a flat base 76, and a domeshaped flexible portion 77 forming a flow cavity 78. A diaphragm 79 extends across the cavity and includes a central imperforate portion 80 with perforations 81 outside the imperforate region. An inlet (first) conduit 82 and an outlet (second) conduit 83 enter the flow cavity on opposite sides of the valve seat so that in this, as in the other embodiments of the invention, fluid flow must pass across the valve seat in order to flow through the cavity. A projection 84 is integral with the diaphragm and extends to form an oblique lever relative to the plane of the seat.

The operation of the valves should be evident from the foregoing. In FIG. 1, the device is shown in its closed position wherein upstream pressure is not yet sufficient to overcome and open the diaphragm, and there is no physical pressure applied through the flexible portion to open the valve. In this condition, the diaphragm bears against the valve seat and keeps the valve closed. Fluid is retained in the skull at a pressure inherently determined by the valve itself. Should the pressure exceed this level, the diaphragm will move off the seat to relieve it.

Assume now that the pressure determined by the valve is too great for the person to tolerate. Then a force illustrated by arrow 85 in FIG. 2 will be applied through the scalp and against the flexible portion so as to deflect the flexible portion downward into the cavity so that the contact portion 37 presses against projection 36 and displaces the diaphragm away from the valve seat. Now, fluid will drain through the bypass channels, through the flow port, across the valve seat, and out the valve. The valve will remain open to flow until force 85 is removed. Bypass channels 37a assure that flow port 32 will not be closed by the flexible portion when it is pressed against barrier 30.

Figure 2:
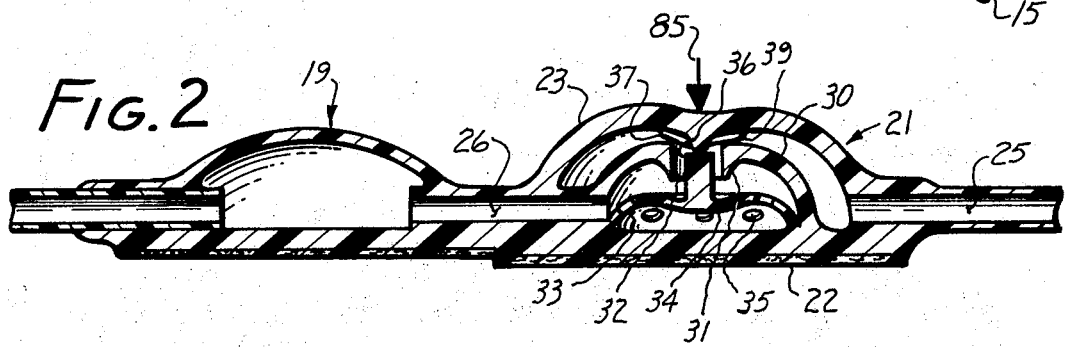
FIG. 2 is a partial view as in FIG. 1 showing the system in another operating condition.
Figure 3:
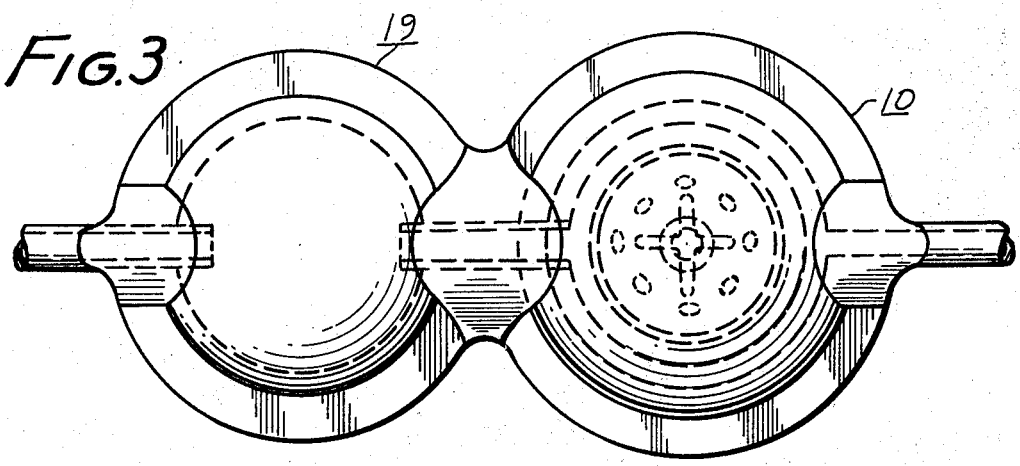
FIG. 3 is a plan view of part of FIG. 1 taken at line 3—3 of FIG. 1.

The lozenge 19 is provided for various purposes of testing and injection. Should injection of a fluid into the brain be desired, it may be injected from a syringe whose needle is pressed through the wall of the lozenge, while the downstream shunt is pinched closed by external pressure and the valve is held open as shown in FIG. 2. This will cause the medication to flow back into the brain. This lozenge can also be utilized to clear any obstructions in the shunt tube because, if it is pressed while the valve itself is not mechanically held open, pressure generated by the lozenge will tend only to close the valve more tightly, while it will tend to expel fluid downstream, thereby clearing the check valve. It will thereby be noted that this valve also acts as a unidirectional check valve which, however, is subject to being opened by contact with the projection.

FIG. 1 also illustrates that the prjection may be considered to be on the flexible portion of the body instead of on the diaphragm because, of course, the nib 38 may be of any desired length and may, if desired, make direct contact with the diaphragm. In this sense it is sometimes referred to as a "projection," and it is clear that a "projection" which enables the flexible portion and the diaphragm to make contact with one another can be mounted either to the diaphragm or to the flexible portion, and that in every case the projection will be regarded as an extension of one or the other, whereby the flexible portion and the diaphragm may be considered so disposed and arranged as to be contacted by the other in order to displace the diaphragm from the seat and to permit fluid to flow across the seat. The same relationship is comprehended should the "projection" be provided as a separate piece. Also, although it is not desirable to have loose pieces in a system such as this, it may be a free section of rod trapped in the flow port. The projection may be formed on the diaphragm and flexible portion, if desired. However, the projection, when attached to the diaphragm, appears to give stability to the diaphragm because of the available side support from the walls of the flow port.

The functioning of the other embodiments is similar, except that, in the embodiments of FIGS. 4 and 9, a tilting action takes place instead of the axial displacement of FIGS. 1 and 7. In both cases, the diaphragm will be displaced by sufficient fluid pressure.

In FIG. 4, the valve is shown in its normally closed position due to the inherent structural properties of the diaphragm itself, i.e., the stiffness or rigidity of the diaphragm. In the event that upstream pressure becomes sufficiently large, then the condition shown in FIG. 5 occurs wherein the diaphragm will lift up to relieve the excess pressure. In the event that positive drainage is desired to relieve excess pressure, the flexible portion will be pressed through the flexible portion 49, as shown by arrow 86 in FIG. 6. The projection acts as a lever to pry up one edge of the imperforate portion to permit fluid to flow across the valve seat. When the flexible portion is released, the diaphragm will return to its normal position as in FIG. 4. In this, as in all embodiments, the lozenge may be placed downstream, as well as a check valve.

The operation of the valve of FIG. 9 is the same as that just described for FIG. 4.

In the case of the valve of FIG. 7, its operation is the same as that of FIG. 1, downward deflection of the flexible portion pressing against the enlargement on the projection and forcing the diaphragm away from the seat to open the flow port.

The perforations in the diaphragms are variously provided as flow channels or and for equalization of pressure on opposite sides in regions outside the valve seat, as will be obvious from the foregoing.

This invention provides a valve for the controllable release of entrapped fluids which has its own inherent release pressure, but which can also be opened by external forces. The device is simple in construction and concept and has no relatively moving parts to become obstructed or to get out of order. The device is simple, reliable, and its functioning can readily be checked out by external palpation.

This invention is not to be limited by the embodiments shown in the drawings and described in the description, which are given by way of example and not of limitation, but only in accordance with the scope of the appended claims.

I claim:

1. A valve for controllably releasing entrapped body fluids, comprising: a body having an inner surface bounding a flow cavity therein, said body having a flexible portion which can be deflected into the cavity; a first and a second conduit entering said cavity through said body to provide for flow of fluid through the cavity; a valve seat in said cavity across which fluid must flow when flowing from one conduit to the other; a diaphragm extending across the cavity and having an imperforate portion overlaying the valve seat and so proportioned and arranged as to close the same in one position of the said imperforate portion and to leave it open in another position; and a projection on one of said flexible portion and diaphragm so disposed and arranged as to be contacted by the other, thereby to displace the diaphragm from the seat and permit fluid to flow across said seat.

2. A valve according to claim 1 in which the diaphragm is perforated outside the said imperforate region, whereby when the imperforate portion of the diaphragm is seated on the valve seat, its opposite sides are exposed to the pressure of respective ones of said conduits.

3. A valve according to claim 1 in which the valve seat is formed on said inner surface, with one of the conduits passing through the body inside said seat, the seat lying in a plane, and in which the projection is integral with the diaphragm and forms an oblique lever relative to said plane, whereby pressing the said flexible portion of the body against the projection tilts the diaphragm so as to interrupt its seal with the valve seat.

4. A valve according to claim 3 in which the exterior portion of the body on which the valve seat lies is flat.

5. A valve according to claim 1 in which a barrier extends across the cavity, the valve seat being formed on said barrier with a flow port passing through the barrier within the valve seat, the diaphragm lying on one side of said barrier adjacent to said valve seat, and the projection being proportioned so as to enter the flow port in at least one position of the valve and having a cross-section less than that of said flow port so as to permit flow of fluid past it.

6. A valve according to claim 5 in which the projection is mounted to the flexible portion of the body.

7. A valve according to claim 5 in which the projection is mounted to the diaphragm.

8. A valve according to claim 7 in which a contact portion is mounted to the flexible portion to make contact with the projection, said contact portion forming bypass channels to form flow passages to the flow port when the contact portion is pressed against the barrier.

9. A valve according to claim 7 in which an enlargement is formed on the projection on the side of the barrier away from the diaphragm.

10. A valve according to claim 7 in which the outer surface of that portion of the body on the opposite side of the cavity from the flexible portion is flat.

11. A valve according to claim 10 in which a contact portion is mounted to the flexible portion to make contact with the projection, said contact portion forming bypass channels to form flow passages to the flow port when the contact portion is pressed against the barrier.

12. A valve according to claim 1 in which the diaphragm has an inherent structural strength tending to bias the imperforate portion toward and against the valve seat.

13. A valve according to claim 3 in which the diaphragm has an inherent structural strength tending to bias the imperforate portion toward and against the valve seat.

14. A valve according to claim 5 in which the diaphragm has an inherent structural strength tending to bias the imperforate portion toward and against the valve seat.

15. A valve according to claim 8 in which the diaphragm has an inherent structural strength tending to bias the imperforate portion toward and against the valve seat.

16. A valve according to claim 1 in which a lozenge having a cavity defined in part by a flexible wall portion, and having a pair of conduits entering into its cavity is connected to the cavity of the valve by means of a fluid connection between one of its conduits, and the conduit in the valve from which fluid flows after being released by displacement of the diaphragm from the valve seat.

17. A valve according to claim 1 in which a unidirectional check valve is fluidly connected to the conduit from which fluid flows after being released by displacement of the diaphragm from the valve seat.

* * * * *